United States Patent [19]

Jones et al.

[11] 3,998,924

[45] Dec. 21, 1976

[54] RECOVERY OF NON-FERROUS METALS FROM ACIDIC LIQUORS WITH A CHELATE EXCHANGE RESIN IN PRESENCE OF IRON(III)

[75] Inventors: Kenneth C. Jones; Robert M. Wheaton, both of Walnut Creek, Calif.

[73] Assignee: The Dow Chemical Company, Midland, Mich.

[22] Filed: Aug. 4, 1975

[21] Appl. No.: 601,872

[52] U.S. Cl. .................................. 423/7; 423/24; 423/63; 423/100; 423/139; 260/2.2 R
[51] Int. Cl.$^2$ .................. C01G 9/00; C01G 43/00; C01G 3/00; C01G 53/00
[58] Field of Search ............... 423/7, 24, 63, 100, 423/139; 75/101 BE; 260/2.2 R

[56] References Cited
UNITED STATES PATENTS

| | | | |
|---|---|---|---|
| 2,980,607 | 4/1961 | Mock et al. | 210/31 |
| 3,109,732 | 11/1963 | Goven | 75/101 BE |
| 3,214,239 | 10/1965 | Hazen et al. | 75/101 BE |
| 3,475,163 | 10/1969 | Watson et al. | 75/101 |
| 3,669,651 | 6/1972 | Spedden et al. | 75/104 |
| 3,868,439 | 2/1975 | Wadsworth | 423/41 |
| 3,873,668 | 3/1975 | Melby | 423/24 |

OTHER PUBLICATIONS

Chem Abstracts vol. 64, 1966 No. 93006.

*Primary Examiner*—Oscar R. Vertiz
*Assistant Examiner*—Brian E. Hearn
*Attorney, Agent, or Firm*—David B. Kellom

[57] ABSTRACT

The recovery of non-ferrous transition metals such as copper and nickel from acidic hydrometallurgical leach liquors with a 2-picolylamine chelate exchange resin is improved by the in situ reduction of $Fe^{+3}$ present in the leach liquor with a water soluble reducing agent during the resin loading cycle. The chelate resin functions not only as a selective sorbent for the desired metal values, but also as a catalyst for the in situ reduction of $Fe^{+3}$ to $Fe^{+2}$. A suitable reducing agent such as $SO_2$ or HCHO is fed into the chelate resin column with the leach liquor. When the loading cycle is completed, regeneration with sulfuric acid gives an enriched eluent with a high non-ferrous metal:Fe ratio. For example, using $SO_2$ with a copper leach liquor feed, subsequent regeneration at about 70° C gives better than 90 percent recovery of the copper as a highly enriched copper sulfate solution with a Cu:Fe ratio of about 10,000.

12 Claims, 2 Drawing Figures

RECOVERY OF NON-FERROUS METALS FROM ACIDIC LIQUORS WITH A CHELATE EXCHANGE RESIN IN PRESENCE OF IRON(III)

BACKGROUND OF THE INVENTION

Hydrometallurgical processes for the recovery of metal values from low grade ore are increasingly important to the mining industry. Of particular interest is the hydrometallurgical recovery of copper and nickel. Typically an ore containing copper, nickel, and other valuable metals including chromium and cobalt as sulfide, oxide, or silicate salts is leached with aqueous sulfuric acid to form a dilute leach liquor containing the desired metal values. Wadsworth U.S. Pat. No. 3,868,439 describes one such process for leaching low grade copper ore with dilute sulfuric acid at a pH of 1.0–2.0. The metal values are then concentrated and purified into a form suitable for the recovery of the metals by conventional means.

Extraction of hydrometallurgical leach liquors with liquid extractants can be used to recover the metal values as described for example by Watson, Mod, and Teumac U.S. Pat. No. 3,475,163 or Skarbo U.S. Pat. No. 3,853,725 or U.S. Pat. No. 3,855,090. However, solvent losses make this technology less attractive for leach liquors containing a low level of metal values. Such losses can be eliminated by use of a solid ion exchange resin as an extractant, yet conventional ion exchange and chelate resins do not have the selectivity and activity essential for processing acid leach liquors.

Recently it has been discovered that chelate resins containing 2-picolylamine groups pendent to a crosslinked polymer matrix show particular promise as selective solid extractants for acidic leach liquors. They have a combination of desirable properties including capacity, kinetics, selectivity, and stability. Particularly important is the selectivity of these resins for removing valuable heavy metals including copper and nickel in the presence of ferric iron at a pH between about 1–5. The adsorbed metal values can be eluted with 1–10 N sulfuric acid with high recovery and a 5–10 fold decrease in iron content. However, for some applications such as direct electrolysis, an even lower iron content may be required thus necessitating further treatment.

Ferric iron is also detrimental to conventional precipitation or cementation operations. Reduction to ferrous iron with such materials as $SO_2$ has been used although such reductions are often slow. Goren U.S. Pat. No. 3,109,732 and Spedden e.a. U.S. Pat. No. 3,669,651 use activated carbon as a catalyst for treating acid leach liquors with $SO_2$. In Spedden & Malouf U.S. Pat. No. 3,819,797 $SO_2$ or $CO$ is injected below the surface of the ore body being leached to reduce residual $Fe^{+3}$ prior to further processing.

SUMMARY OF THE INVENTION

It has now been discovered that the 2-picolylamine resins function not only as selective chelate resins, but also as catalysts for the in situ reduction of $Fe^{+3}$ to $Fe^{+2}$ by water soluble reducing agents resulting in a further 5–10 fold or more decrease in the iron content of the eluent recovered from the loaded resin.

More specifically, an improved process has been developed comprising contacting (1) an acidic hydrometallurgical leach liquor containing ferric iron and non-ferrous transition metal values at a pH of about 1.0–5.0 with (2) a water-insoluble 2-picolylamine chelate resin of Formula I in the presence of (3) at least about 0.3 mole per mole ferric iron of a water-soluble reducing agent to concurrently reduce the ferric iron and extract the non-ferrous transition metal values; and thereafter regenerating the loaded chelate resin to recover an enriched aqueous product containing at least 20 parts non-ferrous transition metal per part iron. Preferably the water-soluble reducing agent is $SO_2$, $HCHO$, $NH_2OH$ or a water-soluble equivalent thereof. Furthermore it is advantageous to regenerate the resin with aqueous sulfuric acid at about 40°–90° C.

DESCRIPTION OF THE INVENTION

A. 2-Picolylamine Chelate Resin

Figure 2:
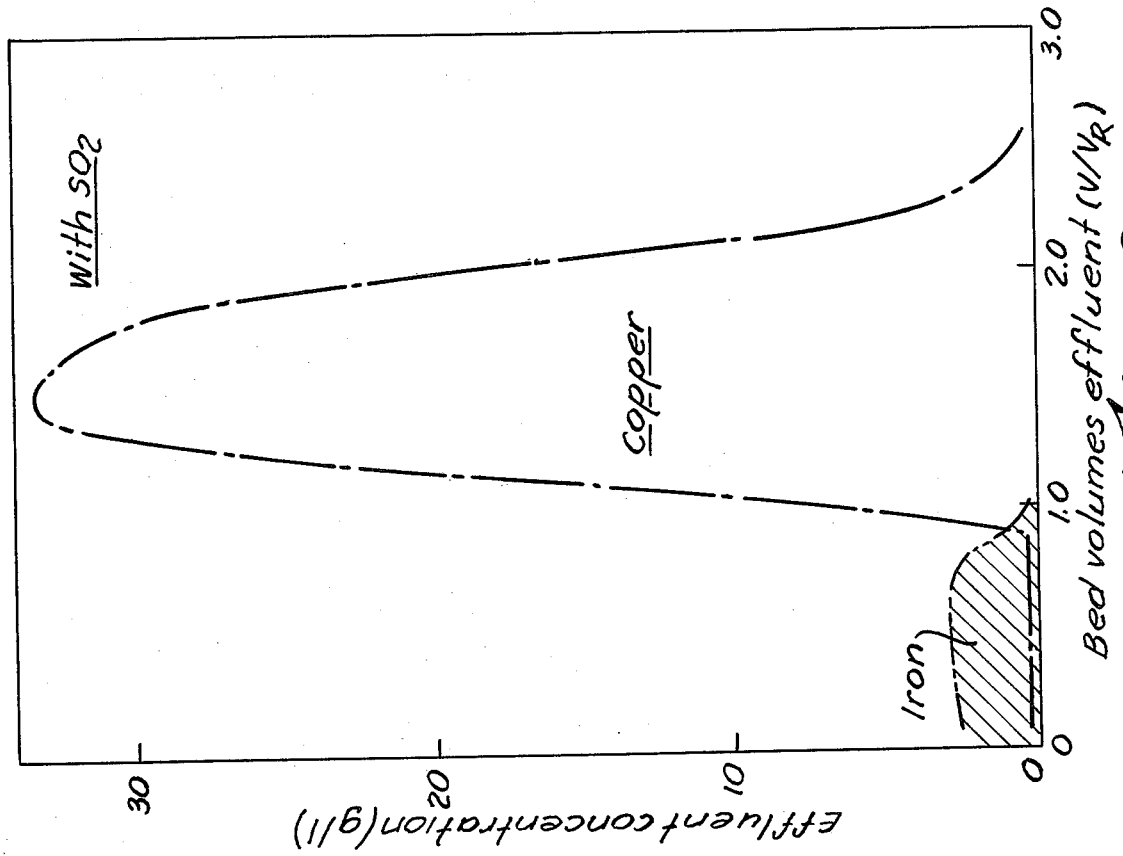
FIG. 2 is the effluent curve of copper and iron removal from the resin after in situ reduction with $SO_2$.

As described by Grinstead & Nasutavicus in pending U.S. patent application Ser. No. 587,185 filed June 16, 1975, 2-picolylamine resins of Formula I can be prepared by reacting a crosslinked haloalkyl polymer matrix resin with a 2-picolylamine, i.e.:

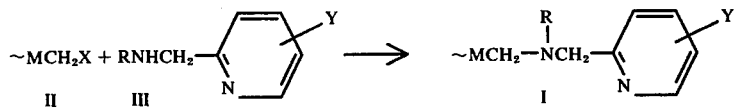

where M is a matrix resin with a plurality of halomethyl groups;
Y is H or $C_1$-$C_4$ alkyl; and
R is
a. H, $C_1$-$C_4$ alkyl, or $C_2$-$C_4$ hydroxyalkyl;
b. allyl, benzyl or o-hydroxybenzyl;
c. $-(C_2H_3R'NR')_y$

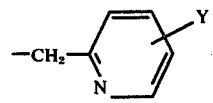

wherein each R' is H or $CH_3$ and y is 0 or 1;
d. $-(CH_2)_mOY$ where m is 2 or 3; or
e. $-C_2H_3R'NR_1R_2$ where R' is H or $CH_3$, $R_1$ is H, $C_1$-$C_4$ alkyl, $C_2$-$C_4$ hydroxyalkyl, phenyl or benzyl, and $R_2$ is H, $C_1$-$C_4$ alkyl or $C_2$-$C_4$ hydroxyalkyl;
f. $-C_2H_4SR'''$ where $R'''$ is $C_1$-$C_4$ alkyl;
g. $-C_nH_{2n}COOY$ where n is 1 or 2;
h. $-C_nH_{2n}SO_3^-$ where n is 1 or 2; or
i. $-CH_2Z$ where Z is $-CONH_2$ or $-NHCONH_2$.

Preferably the polymer matrix is a crosslinked chloromethylaromatic resin, such as a chloromethylated styrene-divinylbenzene or phenol-formaldehyde polymer used in the synthesis of standard ion exchange resins. Particularly suitable are copolymers of a monovinylaromatic monomer such as styrene, alpha-methylstyrene, chlorostyrene, vinyltoluene, or vinylnaphthalene, crosslinked with a polyvinyl monomer such as divinylbenzene, ethylene glycol dimethacrylate, diallyl succinate, divinyltoluene, etc. The basic technology for producing ion exchange resins from such aromatic resins is shown, for example, by Staudinger e.a. U.S. Pat. Nos. 2,089,444, D'Alelio 2,366,007, Boyer 2,500,149, McBurney 2,591,573, and Bauman e.a. 2,614,099. More recently Mindick & Svarz U.S. Pat. Nos. 3,549,562 and Corte & Meyer 3,637,535 have described a process for making more porous copolymer beads. Thereafter the aromatic polymers are halomethylated to introduce an average of about 0.1–1.0 halomethyl groups per aromatic group as the reactive site for addition of the aminopyridine chelate functionality. Alternately, the intermediate halomethyl copolymers can also be prepared by copolymerization of vinylbenzyl chloride as described, for example, in Clarke & Hamerschlag U.S. Pat. Nos. 2,780,604, McMaster 2,992,544, and Barrett 3,843,566. The degree of chloromethylation is an important process variable since normally one chelant group is introduced for each reactive chloromethyl group.

2-Picolylamines of Formula III are known heterocyclic compounds; Cf Weissburger "The Chemistry of Heterocyclic Compounds", Vol. 14, New York (1961). Of particular interest herein are the 2-picolylamine resins derived from 2-picolylamine, N-methyl-2-picolylamine, N-(2-hydroxyethyl)-2-picolylamine, N-(2-methylaminoethyl)-2-picolylamine and bis-(2-picolyl)amine. Such amines readily react with the halomethyl matrix resin amine in the presence of a suitable liquid diluent, such as methylene chloride, chloroform, 1,2-dichloroethane, toluene, methanol or water to give the 2-picolylamine chelate resin. Typically such resins have a chelate capacity of about 0.1–3.8 meq/g dry resin in acid salt form.

The chelate resins are similar in form to the initial matrix resin. Their physical and chemical properties, such as resin density, water holding capacity, strong base capacity, tertiary amine capacity, and volume shrink-swell can be measured by standard ion exchange resin methods. They are normally used in a water wet acid salt form, but are also stable in free base form.

B. Chelate Capacity and Selectivity

The chelate capacity of these resins is conveniently determined by shaking the resin with aqueous copper sulfate (10 g Cu/l; pH 4.0) for 24 hours. The resin is recovered, washed with water and the adsorbed copper eluted with sulfuric acid or ammonium hydroxide. The copper in the eluate is then determined and the loading capacity calculated. The observed equilibrium loading values for the active picolylamine resins correspond quite closely to the theoretical 1:1 ratio based on elemental nitrogen.

Data on resin selectivity with other transitional metal ions can be obtained by similar techniques. Copper, nickel, ferric iron, cobalt, silver, gold, mercury, platinum, vanadium, molybdenum, chromium, cadmium, uranium and zinc are highly adsorbed while calcium, magnesium, aluminum, and ferrous iron are more weakly adsorbed. Except for ferric iron, the strongly adsorbed ions are those of usual economic interest in hydrometallurgical leach operations. The two metals of greatest current interest, copper and nickel, are both more strongly adsorbed from acidic leach liquors by the 2-picolylamine resins than ferric iron under practical operating conditions.

C. Use in Hydrometallurgical Operations

The basic technique for hydrometallurgical separations with chelate resins is described in Mock e.a. U.S. Pat. No. 2,980,607 using a chelate resin having a crosslinked styrene-divinylbenzene matrix and iminodiacetic acid groups as the chelate functionality. However, such a resin is not suitable for use with acidic leach liquors.

The new 2-picolylamine resins provide a significant improvement in selectivity for the recovery of desired metal ions from an acid leach liquor, yet as the same time the adsorbed metal species can be readily eluted in more concentrated form for further processing. Typically a 5–10 fold decrease in iron content of the effluent compared with the feed liquor is obtained by simple regeneration with 1–10 N sulfuric acid. By preelution of the iron in a multistage regeneration, a higher purity non-ferrous metal effluent can be obtained at the expense of lower recovery and reduction in productivity because of the time required for the added step and recycle recovery of the concurrently stripped non-ferrous metal.

D. PA Resin as $Fe^{+3}$ Reduction Catalyst

Although activated carbon has been recommended as a catalyst for reducing $Fe^{+3}$ in leach liquors with $SO_2$, it has no significant capacity as an extractant for the non-ferrous metal values. In contrast, the 2-picolylamine resins are active both as selective chelate resins and also concurrently as a catalyst for the in situ reduction of $Fe^{+3}$ to $Fe^{+2}$ by water-soluble reducing agents. A similar beneficial catalytic activity has not been found in tests with iminodiacetic acid chelate resins, or with the styrene-divinylbenzene copolymer matrix resin free of the 2-picolylamine functionality. Thus the 2-picolylamine resins serve a highly useful and previously unachieved and unrecognized dual role.

Figure 1:
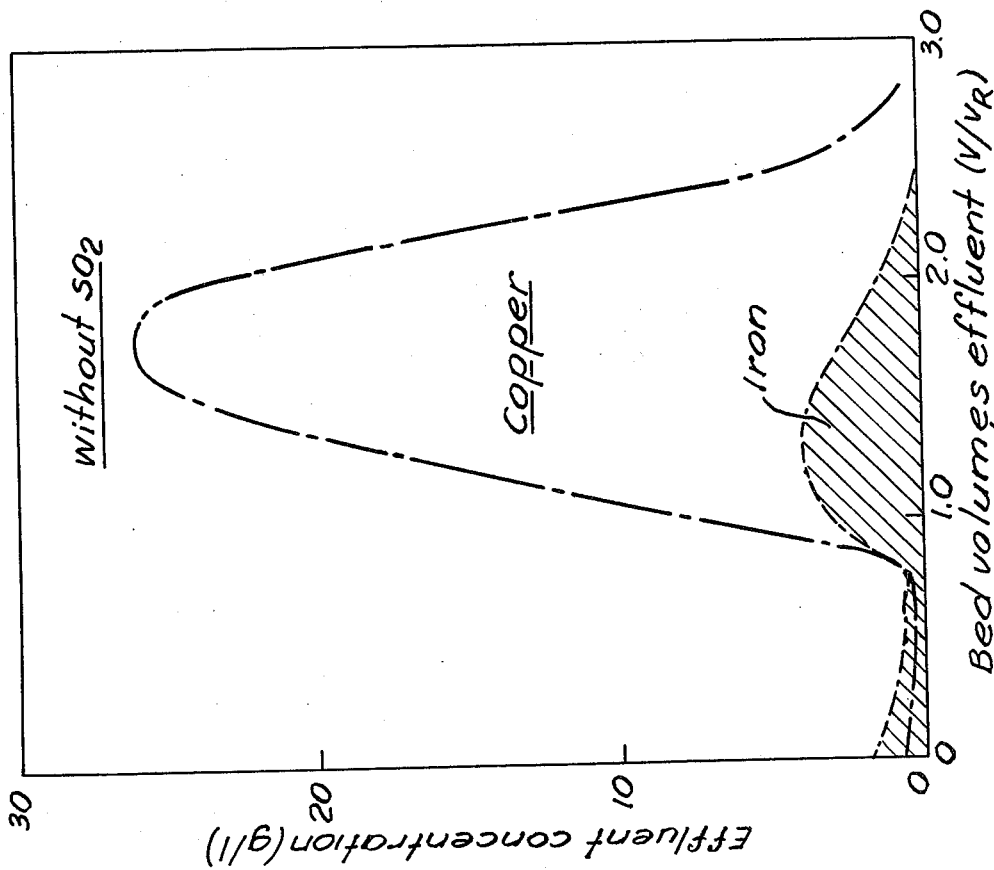
FIG. 1 is the effluent curve of copper and iron removal from the resin without $SO_2$.

By adding the leach liquor and $SO_2$ simultaneously to a 2-picolylamine resin column, reduction takes place in situ with a total residence time of not more than 2–5 minutes. Upon subsequent elution a further 5–10 fold or greater decrease in the iron content of the effluent is obtained in a single step operation. A typical comparison of elution curves is shown in FIGS. 1 and 2. Instead, with a copper leach liquor, aqueous effluents containing Cu:Fe ratios of 1,000 or more have been obtained with more than 90 percent recovery of the adsorbed Cu in a single step elution with sulfuric acid.

The uptake of copper and other non-ferrous transition metals is affected only slightly by the uptake of $Fe^{+3}$ suggesting that the $Fe^{+3}$ is being sorbed by a different mechanism. The $Fe^{+3}$ uptake appears to result from sorption of anionic iron complexes by the anion exchange sites of the resin. Reduction may involve reaction of $Fe^{+3}$ at such sites in the presence of the chelated non-ferrous metal. But regardless of the precise mechanism, the 2-picolylamine resins do catalyze the in situ reduction of $Fe^{+3}$ to $Fe^{+2}$ which passes through the resin with minimal sorption.

E. Conditions for In Situ $Fe^{+3}$ Reduction

While $SO_2$ is the preferred reducing agent for use with the 2-picolylamine resins because of availability at processing sites, other water-soluble reducing agents can be used including HCHO, NH$_2$OH and water-soluble equivalents thereof such as paraformaldehyde, sodium bisulfite, sulfurous acid, etc. Suitable reducing agents must have a standard redox potential in acid solution greater than −0.771 volts.

The reducing agent may be added to the leach liquor prior to contact with the chelate resin. Without a catalyst, however, the slow reduction requires a long inventory time. Better results are obtained by essentially simultaneous addition of the reducing agent to the leach liquor as it is contacted with the resin. Not less than about 0.3 mole of reducing agent nor more than about 1.0 mole per mole ferric iron in the liquor is required. Generally about 0.3–0.6 mole per mole ferric iron is adequate.

The in situ reduction and selective sorption of the non-ferrous transition metals occur readily at flow rates encountered in commercial ion exchange operations using feed liquors containing as low as about 50 mg/l of copper or other heavy metal in aqueous solution at a pH of about 1.0–4.5 and operating temperatures ranging from about 0°–100° C. The process is particularly effective with feed liquor containing about 0.1–10 g/l of the desired metal and having a pH of about 1.5–3.0 and a loading temperature of about 15°–60° C.

F. Elution and Regeneration

The absorbed non-ferrous metals can be eluted with more concentrated acid, e.g. 1–10 N H$_2$SO$_4$ to recover an enriched aqueous product and regenerate the 2-picolylamine resin. Alternately, most sorbed metals can also be eluted with dilute (1–5 N) ammonium hydroxide. With ambient temperature loading and elution cycles coupled with in situ reduction of Fe$^{+3}$ with SO$_2$, aqueous products can be obtained with Cu/Fe ratios of 20 or more.

Although the PA resins are an effective catalyst for the in situ Fe$^{+3}$ reduction, the reduction is not always fully completed in the loading cycle, particularly when loading at ambient temperature. Some iron remains sorbed by the resin. However, rinsing the loaded resin briefly with water or eluting with warm sulfuric acid at about 40°–90° C results in removal of the sorbed iron prior to elution of the non-ferrous metals and gives highly purified product solutions containing better than 90 percent of the non-ferrous metal values with non-ferrous metal Fe ratios of 1,000 or more.

Loading at ambient temperature and elution at about 40°–90° C is often advantageous. When used in conjunction with a copper electrolysis operation, regeneration of the loaded resin with spend cell electrolyte containing 20–40 g Cu/l in 2–4 N H$_2$SO$_4$ at 40°–60° C is particularly effective. However, good results are obtained operating wholly at ambient temperatures.

Optimum conditions will depend on the specific resin, metal, and leach liquor stream as well as field conditions. The process is also suitable for resin-in-pulp or other continuous ion-exchange systems.

To illustrate further the present invention, the following specific examples are given. Unless otherwise specified, all parts and percentages are by weight, and all analyses are by standard techniques.

EXAMPLE 1:

2-Picolylamine Resins

A. HPA Resin

To a slurry of 16 parts of commercial 20–50 mesh chloromethylated macroporous styrene — 6% divinylbenzene copolymer beads containing 20 percent chlorine in 28 parts water containing 7 parts of sodium sulfate was added 13.0 parts N-(2-hydroxyethyl)-2-picolylamine (HPA). The mixture was refluxed for 3 hours and then filtered to recover a resin product containing 8.0 percent N. When equilibrated with aqueous copper sulfate (1 g Cu/l, pH 2.0), the resin adsorbed 27 mg Cu/ml resin.

B. BPA Resin

To 68.4 parts chloromethylated styrene — 1.8 percent divinylbenzene gel copolymer beads (20.1 percent Cl) swollen in 40 parts toluene was added 180 parts bis(2-picolylamine) and the mixture was refluxed for 6 hours. The resulting chelate resin beads were then converted into chloride salt form with excess 1 N HCl. Analysis indicated about 91 percent amination. This resin had a water content of 56 percent, an exchange capacity of 1.1 meg/ml wet resin and a pK$_a$ of 3.4. a column test with a simulated copper leach solution containing 0.9 g Cu and 1.6 g Fe (III) per liter as sulfates at pH 1.7 (Cu:Fe = 0.56), the resin adsorbed about 42 mg Cu/ml and 6 mg/ml Fe, (Cu:Fe = 7.0), a total metal loading corresponding to about 1 mole per mole of amino nitrogen.

C. Other PA Resins

Using similar methods, a wide variety of 2-picolylamine resins have been synthesized from chloromethylated aromatic copolymer beads and evaluated as selective adsorbents for transition metals.

Data indicate that the 2-picolylamine chelate resins can be used in column operations over a wide range of conditions. The following table indicates the more important process variables and the general and preferred operating ranges for copper and nickel recovery.

Table I

| | Process Conditions | |
|---|---|---|
| Process Variable | Preferred | General |
| 1. Metal ions absorbed | Cu, Ni | Co, Cd, Zn, U, Hg, V, Ag, Pt, Cr(VI), Mo |
| 2. Anions present | Sulfate | Chloride, nitrate, sulfite |
| 3. Feed pH | 1.0–3.0 | 1.0–5.0 |
| 4. Temperature | 15°–60° C | 0°–100° C |
| 5. Flow rate | 0.1–0.25 l/min/l resin | Up to 1.0 l/min/l resin |
| 6. Regenerant | 1–4 N H$_2$SO$_4$ | 0.5–10 N H$_2$SO$_4$ 1–10 N NH$_4$OH |

EXAMPLE 2:

HPA Resin — In Situ Reduction

A. Standard Conditions

A 1.2 cm id resin column was loaded with 103 ml of the macroporous HPA resin of Example 1A giving a bed depth of 91 cm. The bed was rinsed with 2 N H$_2$SO$_4$ and then water to an eluate pH ≥ 2. A synthetic copper leach liquor containing 1.2 g/l Cu, 1.70 g/l Fe$^{+3}$, 1.67 g/l Mg and 1.25 g/l Al as a sulfate solution at pH 2.0 was added downflow to the column at a feed rate of about 14 ml/min and the column effluent fractions analyzed for copper and iron by atomic adsorption. Both copper and iron were sorbed by the HPA resin with iron break through ahead of copper.

Following loading to near-equilibrium conditions, the HPA resin was stripped with 2.0 N $H_2SO_4$ at 70° C again in conventional downflow column operations, collecting successive cuts until both Fe and Cu were essentially removed from the resin, analyzing each of the cuts. FIG. 1 is the resulting effluent curve. Total copper sorbed by the resin was 28.9 g/l HPA resin, total iron 4.27 g/l giving a weight ratio of resin Cu:Fe of 6.76. There is some fractionation during elution with an effluent Cu:Fe ratio at the Cu peak of 11.1.

B. In Situ Reduction With $SO_2$

Utilizing the same HPA resin feed and operating conditions as in Example 2A but introducing $SO_2$ into the feed stream at a 0.61 mole ratio to iron, a total copper loading of 30.8 g/l resin was attained while iron loading was 2.35 g/l resin for a resin Cu:Fe ratio of 13.1. Upon elution of the copper and iron with 2 N $H_2SO_4$ at 70° C, the iron was readily removed ahead of the copper resulting in a highly pure copper effluent with 90 percent copper recovery and a Cu:Fe ratio at the peak copper elution of about 10,000 — a remarkable improvement over the untreated system (see FIG. 2).

C. Prereduction With $SO_2$

Again utilizing the same HPA resin (Resin A) but with the $Fe^{+3}$ in the feed first reduced to $Fe^{+2}$ by 16+ hour contact with an equimolar quantity of $SO_2$, an excellent copper recovery (>90%) and good copper purity (Cu:Fe of 240) was obtained. The difficulty of this approach is the long residence time of at least 3 or more hours required for complete reduction of $Fe^{+3}$.

D. Preelution with $SO_2$

Utilizing the same HPA resin but a slightly different feed (1.0 g/l Cu; 0.9 g/l Fe; pH = 2.0) loading was continued to near-equilibrium. In an effort to produce high purity copper an initial elution of the resin was carried out with 3 bed volumes of 0.05 M $SO_2$. This was effective in removing most of the iron resulting in a peak copper cut, on subsequent elution with 2N $H_2SO_4$, having a Cu:Fe ratio of 46. This method is relatively unsatisfactory, however, in that about 24% of the copper was removed from the resin during the initial $SO_2$ elution step.

The Runs of Examples 2A-D show the dual catalytic and selective sorption properties of the HPA resin. The in situ reduction process provides a rapid method for producing on a solution highly enriched with Cu or Ni and depleted in Fe. Time consuming pretreatment or multistep elution techniques are both eliminated.

The specificity of the PA resin catalysts was further demonstrated in tests substituting a commercial iminodiacetic acid chelate resin (Dowex A-1 Chelate Resin). Unlike the PA resins, this IDA resin has a greater affinity for $Fe^{+3}$ than $Cu^{+2}$ at acidic pH. Addition of 1 mole $SO_2$ per mole $Fe^{+3}$ increased the resin Cu:Fe ratio from 0.48 to 0.71, and the peak Cu:Fe elution ratio from 1.4 to 2.8. A sample of macroporous styrene — 6% DVB copolymer beads was found to be essentially inactive as catalyst for the in situ reduction of $Fe^{+3}$ with $SO_2$.

EXAMPLE 3

In Situ Reduction Conditions

A. A series of runs was made by the method of Example 2B with variation in $SO_2$:Fe ratios from 0.15 to 1.00. The HPA resin of Example 2 and the synthetic copper leach liquor of Example 2A were used. Regeneration was with 2.0 N $H_2SO_4$ at 70° C. The effluent was collected in a series of cuts and Cu:Fe ratios noted at the peak of copper concentration.

Table II $SO_2$:$Fe^{+3}$ Ratio

| Run | Mole Ratio $SO_2$:$Fe^{+3}$ | Resin Loading Cu, g/l | Fe, g/l | Cu/Fe | Elution Peak Cu:Fe |
|---|---|---|---|---|---|
| 3-1 | 0 | 28.2 | 3.6 | 7.8 | 10 |
| 3-2 | 0.15 | 33.4 | 4.5 | 7.4 | 13 |
| 3-3 | 0.30 | 32.6 | 1.4 | 23 | 300 |
| 3-4 | 0.60 | 30.3 | 1.7 | 18 | ~10,000 |
| 3-5 | 1.00 | 23.5 | 1.2 | 20 | 3,000 |

B. In a similar manner, the effect of loading and elution temperature was examined. The $Fe^{+3}$ reduction apparently is not complete during the ambient temperature loading cycle. But the static conditions as the loaded column is heated to 70° C reduces the residual $Fe^{+3}$ which is immediately eluted as a forecut at the start of the acid regeneration.

Table III

Operating Temperature ($SO_2$:$Fe^{+3}$ = 0.60)

| Run | T° C | Resin Loading Cu, g/l | Fe, g/l | Cu/Fe | T° C | Elution Peak Cu:Fe |
|---|---|---|---|---|---|---|
| 3-4 | 25° | 30.3 | 1.7 | 18 | 70° | ~10,000 |
| 3-6 | 25° | 29.7 | 2.5 | 12 | 25° | 22 |
| 3-7 | 25° | 22.7 | 0.8 | 28 | 25°a | 1,200 |
| 3-8 | 70° | 34.2 | 0.7 | 49 | 70° | 2,300 | aPrerinsed with 1 bed volume of water before elution with 2N $H_2SO_4$.

C. Likewise other water-soluble reducing agents were evaluated for the in situ reduction of $Fe^{+3}$ in contact with the HPA resin. Use of a 1:1 mole ratio of hydroxylamine gave a significant improvement with a peak Cu:Fe ratio on elution of 26 compared with 10–11 without an added reducing agent. Substituting formaldehyde gave a similar result with a peak Cu:Fe ratio of 29. While not as effective in these runs as $SO_2$, improved results are obtained with other water-soluble reducing agents.

EXAMPLE 4:

BPA Resin — In Situ Reduction

A. Cu Leach Liquor

Using the methods of Examples 2 and 3 the utility of this invention was checked with the BPA resin of Example 1B and the synthetic copper leach liquor. Total copper and iron uptake are determined from regenerant effluent. Unlike the HPA resin, only Fe is effectively removed with 2.0 N $H_2SO_4$. Cu elution is accomplished with 10 N $H_2SO_4$ or preferably aqueous $NH_3$. Because of the insolubility of iron at the high pH of the ammonia eluent, a meaningful comparison of the effect of $SO_2$ is best determined from total resin loading ratio and the significantly reduced Fe loading on the resin.

Table IV

BPA Resin - In Situ $SO_2$

| Run | Mole Ratio $SO_2:Fe^{+3}$ | Resin Loading Cu, g/l | Fe, g/l | Cu/Fe |
|---|---|---|---|---|
| 4-1 | 0.0 | 28.8 | 10.4 | 2.8 |
| 4-2 | 1.0 | 30.8 | 1.9 | 16.6 |

B. Ni Leach Liquor

The BPA resin can be used to obtain a nickel-iron separation. Again the in situ $Fe^{+3}$ reduction greatly improves the separation. Thus the BPA resin was loaded to a depth of 91 cm in a 1.2 cm diameter glass column; $V = 103$ $cm^3$. The resin was then contacted with 2 N $H_2SO_4$ followed by a water rinse to pH $\geq$ 2. Into this bed was then introduced a synthetic nickel leach solution of the composition: 3.7 g/l Ni; 1.8 g/l Fe; 0.25 g/l Co; 0.1 g/l Cu; 7.9 g/l Mg; 2.98 g/l Mn; and 1.48 g/l Al as sulfates; pH = 1.5. Feed rate was ~14 $cm^3$/min and the column effluent was analyzed for iron, nickel and other elements. Both nickel and iron are sorbed by the BPA resin with a later breakthrough for nickel. Following loading, elution of iron and nickel was accomplished with 2.0 N $H_2SO_4$ at 70° C.

With the addition of 1 mole $SO_2$ per mole $Fe^{+3}$ to the leach liquor fed to the BPA resin column, a Ni:Fe ratio on the loaded resin of 64 was obtained with a peak Ni:Fe elution of 10,000 and >90% recovery of the Ni. In contrast, without added $SO_2$, the Ni:Fe ratio on the resin was only 5.1 (20.2 g/l Ni:3.98 g/l Fe).

EXAMPLE 5

Treatment of Typical Copper Leach Liquor

A. To scale up the process for commercial recovery of copper from a typical copper leach liquor (1.15 g/l, Cu, 1.7 g/l Fe, 2.1 g/l Al, 2.2 g/l Mg) would require two resin beds about 3 m deep operated in series alternating as lead and second columns. Regeneration is carried out on the second column as it reaches Cu saturation. The in situ reduction of $Fe^{+3}$ would be with $SO_2$ introduced at the inlet concurrently with the feed leach liquor. With a loading cycle of about 30.5 bed volumes in 3.8 hours, and an elution-regeneration cycle of about 2.5 bed volumes in 1.1 hour, a total recovery of about 7 pounds $Cu/ft^3$ resin (112 kg $Cu/m^3$ resin) per day is feasible. Such a process has economic advantages over solvent extraction for processing low level leach liquors.

B. A further advantage in commercial operation is the feasibility of elution with spent recycle sulfuric acid from an electrowinning cell. This has been demonstrated in a 1 m deep bed of HPA resin using 2 N $H_2SO_4$ containing 20 g Cu/l at a flow rate of 3.54 ml/min/$cm^2$ (0.87 gpm/$ft^2$). One bed volume of the recycle acid gave a product cut of essentially the same volume containing a 46 g Cu/l and suitable as feed for an electrowinning cell.

We claim:
1. In the process and for the recovery of non-ferrous transition metals from an acidic hydrometallurgical leach liquor containing ferric iron by selective extraction with a 2-picolylamine chelate resin, the improvement comprising:
A. Contacting (1) the acidic hydrometallurgical leach liquor containing ferric iron and nonferrous transition metal values selected from the group consisting of copper, nickel, cobalt, zinc, vanadium, uranium, and cadmium at a pH of about 1.0–5.0 with (2) a water-insoluble chelate exchange resin having a crosslinked polymer matrix and pendent thereto a plurality of methylene-2-picolylamine groups of the formula

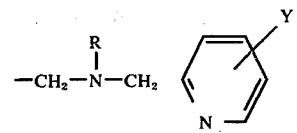

wherein Y is H or $C_1$-$C_4$ alkyl; and
R is
a. H, $C_1$-$C_4$ alkyl, or $C_2$-$C_4$ hydroxyalkyl
b. allyl, benzyl or o-hydroxybenzyl;

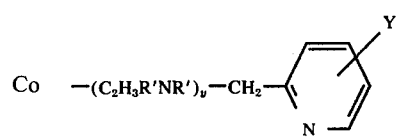

wherein each R' is H or $CH_3$ and Y is 0 or 1;
d. -$(CH_2)_mOY$ where m is 2 or 3;
e. -$C_2H_3R'NR_1R_2$ where R' is H or $CH_3$, $R_1$ is H, $C_1$-$C_4$ alkyl, $C_2$-$C_4$ hydroxyalkyl, phenyl or benzyl, and $R_2$ is H, $C_1$-$C_4$ alkyl or $C_2$-$C_4$ hydroxyalkyl;
f. -$C_2H_4SR'''$ where $R'''$ is $C_1$-$C_4$ alkyl;
g. -$C_nH_{2n}COOY$ where n is 1 or 2;
h. -$C_nH_{2n}SO^-_3$ where n is 1 or 2; or
i. -$CH_2Z$ where Z is -$CONH_2$ or $NHCONH_2$;
in the presence of (3) at least about 0.3 mole/mole ferric iron of a water-soluble reducing agent selected from the group consisting of $SO_2$, $H_2SO_3$, HCHO, paraformaldehyde, $NH_2OH$ or a water-soluble salt thereof to concurrently reduce the ferric iron and extract the non-ferrous transitional metal values; and
B. Regenerating the 2-picolylamine resin to recover an enriched non-ferrous transition metal product solution.
2. The process of claim 1 where the reducing agent is $SO_2$.
3. The process of claim 1 where the leach liquor acid and regenerant are sulfuric acid.
4. The process of claim 1 where the chelate resin is a styrene-divinylbenzene copolymer having pendent thereto a plurality of 2-picolylamine groups and a dry weight capacity of about 0.1–3.6 meg Cu/g resin in dry acid salt form.
5. The process of claim 4 where the 2-picolylamine is N-(2-hydroxyethyl)-2-picolylamine.
6. The process of claim 4 where the 2-picolylamine is bis-(2-picolylamine).
7. The process of claim 1 where the regeneration is carried out at about 40°–90° C with 1-10 N $H_2SO_4$.
8. The process of claim 1 where the absorbed non-ferrous transition metal is eluted with dilute ammonia.
9. The process of claim 1 where a sulfuric acid leach liquor containing about 0.1–10 g Cu/l at pH 1.0–3.0 is contacted with a N-(2-hydroxyethyl)-2-picolylamine resin having a styrene-divinylbenzene copolymer matrix in the presence of about 0.3–1.0 mole $SO_2$/mole $Fe^{+3}$, and thereafter the Cu containing resin is eluted with 1–4 N $H_2SO_4$ to obtain an enriched copper product solution having a Cu/Fe ratio of at least 20.

10. The process of claim 9 where the resin is eluted with $H_2SO_4$ at about 40°–90° C to give a product solution having a Cu/Fe ratio of at least 100.

11. The process of claim 1 where a sulfuric acid leach liquor containing about 0.1–10 g Ni/l at pH 1.0–3.0 is contacted with a bis-(2-picolylamine) resin having a styrene-divinylbenzene copolymer matrix in the presence of about 0.3–1.0 mole $SO_2$ per mole $Fe^{+3}$, and thereafter the Ni containing resin is eluted with 1–4 N $H_2SO_4$ to obtain an enriched nickel product solution having a Ni/Fe ratio of at least 20.

12. The process of claim 11 where the resin is eluted with $H_2SO_4$ at about 40°–90° C to give a product solution having a Ni/Fe ratio at least 100.

* * * * *

UNITED STATES PATENT AND TRADEMARK OFFICE
CERTIFICATE OF CORRECTION

PATENT NO. : 3,998,924

DATED : December 21, 1976

INVENTOR(S) : Kenneth C. Jones and Robert M. Wheaton

It is certified that error appears in the above-identified patent and that said Letters Patent are hereby corrected as shown below:

Column 2, line 50: The formula should read

--  --

Column 3, line 38: "0.1-3.8 meg/g" should read --0.1-3.8 meq/g--.

Column 5, line 52: "spend" should read --spent--.

Column 6, line 21: "1.1 meg/ml" should read --1.1 meq/ml--.

Column 6, line 21: Between "3.4." and "a" should be inserted --In--.

Column 9, line 59: "a" should be deleted.

Column 9, line 62, Claim 1, line 1: "and" should be deleted.

Column 10, line 24: The formula "Co $-(C_2H_3R'NR')_y-CH_2$ —⟨⟩—Y " should read -- c. $-(C_2H_3R'NR')_y-CH_2$ —⟨⟩—Y --.

UNITED STATES PATENT OFFICE
CERTIFICATE OF CORRECTION

Patent No. 3,998,924   Dated December 21, 1976

Inventor(s) Kenneth C. Jones and Robert M. Wheaton

It is certified that error appears in the above-identified patent and that said Letters Patent are hereby corrected as shown below:

Column 10, line 55, Claim 4, line 4: "0.1-3.6 meg Cu/g" should read -- 0.1-3.6 meq Cu/g --.

Signed and Sealed this twenty-sixth Day of July 1977

[SEAL]

Attest:

RUTH C. MASON
Attesting Officer

C. MARSHALL DANN
Commissioner of Patents and Trademarks